G. W. MITCHELL.
Baking Pan.
No. 69,830.  Patented Oct. 15, 1867.
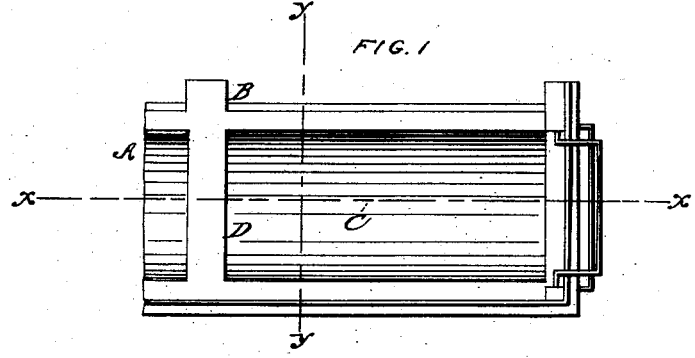
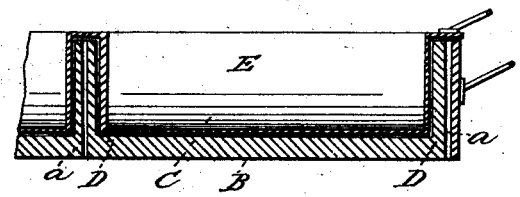
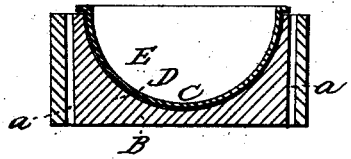
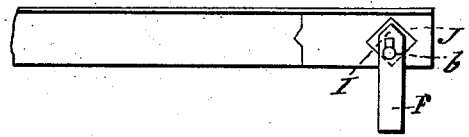
WITNESSES:  INVENTOR:

United States Patent Office.

G. W. MITCHELL, OF NEW YORK, N. Y.

Letters Patent No. 69,830, dated October 15, 1867.

---

BAKING-PAN.

---

The Schedule referred to in these Letters Patent and making part of the same.

---

TO ALL WHOM IT MAY CONCERN:

Be it known that I, G. W. MITCHELL, M. D., of the city, county, and State of New York, have invented new and useful Improvements in "Baking-Pans;" and I do hereby declare that the following is a full, clear, and exact description thereof, which will enable others skilled in the art to make and use the same, reference being had to the accompanying drawings, forming part of this specification.

The present invention relates to a novel-constructed pan for the baking of cake, rolls, and bread, and the invention consists in making the pan in two parts or pieces, one of which, or the bottom or lower part, is made of cast iron of a suitable thickness, with a series of separate and distinct circular or other desired shaped cavities or depressions therein, between which cavities, in and through the thickness of the bottom, is a series of holes at suitable distances or spaces apart, and the other or upper part is made of sheet, cast, or other metal, of suitable thinness, and with cavities or depressions, and of such a shape and size as to fit within the cavities of the cast-iron bottom, resting therein as well as upon its upper surface.

The two sections of the pan constructed or formed as above-stated are to be used as and in a manner to be hereinafter particularly described. In the accompanying plate of drawings my improvements in "baking-pans" are illustrated—

Figure 1 being a plan or top view of a portion of a pan made according thereto.

Figure 2, a vertical section, taken in the plane of the line $x\ x$, fig. 1.

Figure 3, a vertical section, taken in the plane of the line $y\ y$, fig. 1; and Figure 4, a detail view to be hereinafter referred to.

Similar letters of reference indicate like parts.

A, in the drawings, represents my improved baking-pan made in two parts or sections B and C, as follows: The part B, which is the bottom of the pan, is made from cast iron, of a suitable thickness, say from three-quarters of an inch to an inch, and of a width and length to correspond with the size of the oven in which it is to be used. In the upper side of the part B to the pan is a series of cavities or depressions, D, made of a circular or any other suitable shape, in cross or longitudinal section, or both, and of any desired size which is admissible. These depressions or cavities D are separate and distinct from each other, and through the thickness of the part B, forming the lines of separation for the cavities, holes or apertures $a$ are made, to form a communication or a means of circulation for the hot air between the upper and lower sides of such part. The part C of the pan is made of sheet metal, or other suitable thin metal, and of such a shape and size upon its under side as to fit within and upon the upper side of the lower cast-iron section B, it being provided with cavities or depressions E similar to those of the bottom portion B. F, legs hung upon headed pins G to sides of cast-iron pan B. These legs, when put in position, serve as supports to the pan, raising it above the bottom or other portion of the oven on which it is to be placed. To enable the legs F to be fixed in position to support the pan, elongated slots $b$ are made in them for hanging them to the sides of the pan, which enables them to be so moved and adjusted thereon as to bring their angular ends I into the angle or notch J of the depression or cavity in the side of the pan B.

In using the baking-pan above described, the heater or part B must first be heated in any suitable manner, as, for instance, by putting it upon the top of the stove, when, if rolls are to be baked therein, the batter should be made rather thin, and without yeast, soda, or other article to "raise" it, and the roll-pan or part C warmed. Into the cavities of the pan C place the batter, when, setting the pan into the heater, set or place the whole in a hot oven, where, allowing the rolls to remain for fifteen to twenty-five minutes, they will be baked, and be as light as sponge cake, and with a taste equal to if not better than any biscuit made in the common way. Rolls may also be made by putting the batter into the cavities in the "heater," and turning the roll-pan bottom side up over such pan. In baking rolls the heater should be always heated to quite an extent before using. In making loaf bread the dough is first kneaded well and then made into the proper-shaped loaves; then the "heater" is warmed and turned with its cavity side down and upon the bottom; the loaves are then placed across the grooves in such bottom; then place the whole into a moderately hot oven. The holes through the heater are to allow the hot air from the bottom of the oven to come in contact with the bottom of the loaf bread, which will be baked in from thirty-five to seventy minutes, according to the size of the loaf and the heat of the oven.

With my pan bread or cakes can be steamed by laying it on either side of the heater, with water in the roll-pan, over which the "heater" is set, and the whole then placed in a close oven for a few minutes.

The roll and cake-pan or the heater may be used separately to bake rolls and cakes, and the heater can be used with the roll and cake-pan turned bottom side up over it, to bake cakes and rolls, when desired.

What I claim as new, and desire to secure by Letters Patent, is—

1. I claim the combination roll, cake, and bread-baker, consisting of a "heater" and roll or cake-pan, substantially as and for the purpose as described.

2. The heater B, having apertures $a$, in combination with the depressions D, and pans C, substantially as described for the purpose specified.

3. In combination with the heaters B and pans C, I claim the legs F, as herein described for the purpose specified.

The above specification of my invention signed by me this 4th day of April, 1867.

G. W. MITCHELL, M. D.

Witnesses:
 WM. F. McNAMARA,
 ALEX. F. ROBERTS.